US009418253B2

(12) United States Patent
Buchsbaum et al.

(10) Patent No.: US 9,418,253 B2
(45) Date of Patent: Aug. 16, 2016

(54) TRANSPONDER UNIT, SYSTEM AND METHOD FOR CONTACTLESS DATA TRANSMISSION

(71) Applicant: Infineon Technologies AG, Neubiberg (DE)

(72) Inventors: Martin Buchsbaum, Graz (AT); Josef Gruber, St. Ruprecht an der Raab (AT); Peter Raggam, St. Stefan im Rosental (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 847 days.

(21) Appl. No.: 13/684,274

(22) Filed: Nov. 23, 2012

(65) Prior Publication Data
US 2013/0135085 A1 May 30, 2013

(30) Foreign Application Priority Data
Nov. 24, 2011 (DE) .......................... 10 2011 119 687

(51) Int. Cl.
*G06K 7/016* (2006.01)
*G06K 19/07* (2006.01)

(52) U.S. Cl.
CPC .......... *G06K 7/0166* (2013.01); *G06K 19/0723* (2013.01)

(58) Field of Classification Search
CPC ....... H03D 1/24; G06K 7/08; G06K 19/0723; G06K 7/10297; G06K 19/0712; G06K 19/0707; G06K 7/016; H04Q 9/00; H04Q 1/00; H04L 12/56; H04L 7/033; G02F 1/133; H04B 10/00; H04B 1/18; G08B 23/00; G06F 17/00; H04N 7/18

USPC ..................... 340/10.34, 10.2, 573.1, 825.19; 235/451; 375/320, 253; 370/418; 349/34; 398/185; 455/186.1; 348/159; 112/102.5; 700/236; 2/422; 363/72
See application file for complete search history.

(56) References Cited

U.S. PATENT DOCUMENTS

| | | | |
|---|---|---|---|
| 7,392,947 B2 | 7/2008 | Higashi | |
| 8,224,610 B2 | 7/2012 | Diorio et al. | |
| 2005/0185704 A1* | 8/2005 | Alihodzic | G06K 19/0723 375/211 |
| 2005/0225434 A1* | 10/2005 | Diorio et al. | 340/10.4 |

(Continued)

FOREIGN PATENT DOCUMENTS

| | | |
|---|---|---|
| CN | 1940972 A | 4/2007 |
| EP | 1763820 B1 | 3/2007 |

OTHER PUBLICATIONS

Office Action received for Chinese Patent Application No. 201210487727.8, dated Aug. 28, 2014, 9 pages.

*Primary Examiner* — Aristocratis Fotakis
(74) *Attorney, Agent, or Firm* — Viering, Jentschura & Partner mbB

(57) ABSTRACT

In various embodiments, a transponder unit for the contactless transmission of modulated data to a reader is provided. The transponder unit may include: a clock generator configured to generate a clock signal and to synchronize the clock signal in a synchronization mode, on the basis of a signal received from the reader; and a modulator configured to take the clock signal from the clock generator as a basis for modulating data; wherein the modulator is configured to send a signal for starting the synchronization mode to the clock generator.

15 Claims, 11 Drawing Sheets

(56) References Cited

U.S. PATENT DOCUMENTS

| | | |
|---|---|---|
| 2006/0022798 A1* | 2/2006 | Akiyama et al. ............ 340/10.1 |
| 2007/0001856 A1 | 1/2007 | Diorio et al. |
| 2009/0040022 A1* | 2/2009 | Finkenzeller ................ 340/10.1 |
| 2010/0329364 A1* | 12/2010 | Giombanco et al. .......... 375/258 |
| 2012/0133491 A1* | 5/2012 | Yamashita ......... G06K 19/0723 340/10.51 |

\* cited by examiner

TRANSPONDER UNIT, SYSTEM AND METHOD FOR CONTACTLESS DATA TRANSMISSION

CROSS-REFERENCE TO RELATED APPLICATION

This application claims priority to German Patent Application Serial No. 10 2011 119 687.4, which was filed Nov. 24, 2011, and is incorporated herein by reference in its entirety.

TECHNICAL FIELD

Various embodiments relate to a transponder unit, a system and a method for contactless data transmission. Transponder units, also called transponders, are used in chip cards, tags and appliances for mobile data transmission, for example. Together with a reader, transponders form a system for contactless data transmission.

BACKGROUND

A distinction is drawn between passive and active transponders. In the case of a passive transponder, the supply of power and the data interchange between the transponder and the reader are effected by using magnetic or electromagnetic fields. In this case, the transponder uses an antenna to pick up the power required for operation from the field of the reader. By contrast, the active transponder has a dedicated power source, for example a battery. The active transponder can modulate either passively using load modulation or actively using a driver state.

For the contactless data transmission between a transponder and a reader, it is important to observe a precise clock. In known systems, for example based on the ISO/IEC 14443 communication standard, with a passive transponder, the clock (in the ISO/IEC 14443 communication standard: 13.56 MHz) for operating the transponder both in transmission mode and in reception mode is derived from the clock of the reader. The transmission mode is usually effected by means of load modulation, this type of modulation allowing the clock to be derived easily.

If such a clock signal is not available to the transponder in transmission mode—which may be the case with active transponders, for example—then the transponder requires a dedicated clock generator.

EP 1 763 820 B1 discloses a transponder having a dedicated oscillator. In this case, the oscillator is coupled to the signal received from the reader in a phase-locked manner by means of a phase locked loop (PLL) circuit when the transponder unit is in reception mode. When the transponder unit is in transmission mode, that is to say during data transmission from the transponder unit to the reader, the control voltage from the PLL circuit is kept constant. Clock synchronization between the reader and the transponder unit does not take place during this time. An attempt is merely made to keep the frequency of the oscillator as stable as possible. Particularly when transmission times in the transponder unit are relatively long, this can result in clock discrepancies and hence in a disturbance in the data transmission.

SUMMARY

In various embodiments, a transponder unit for the contactless transmission of modulated data to a reader is provided. The transponder unit may include: a clock generator configured to generate a clock signal and to synchronize the clock signal in a synchronization mode, on the basis of a signal received from the reader; and a modulator configured to take the clock signal from the clock generator as a basis for modulating data; wherein the modulator is configured to send a signal for starting the synchronization mode to the clock generator.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
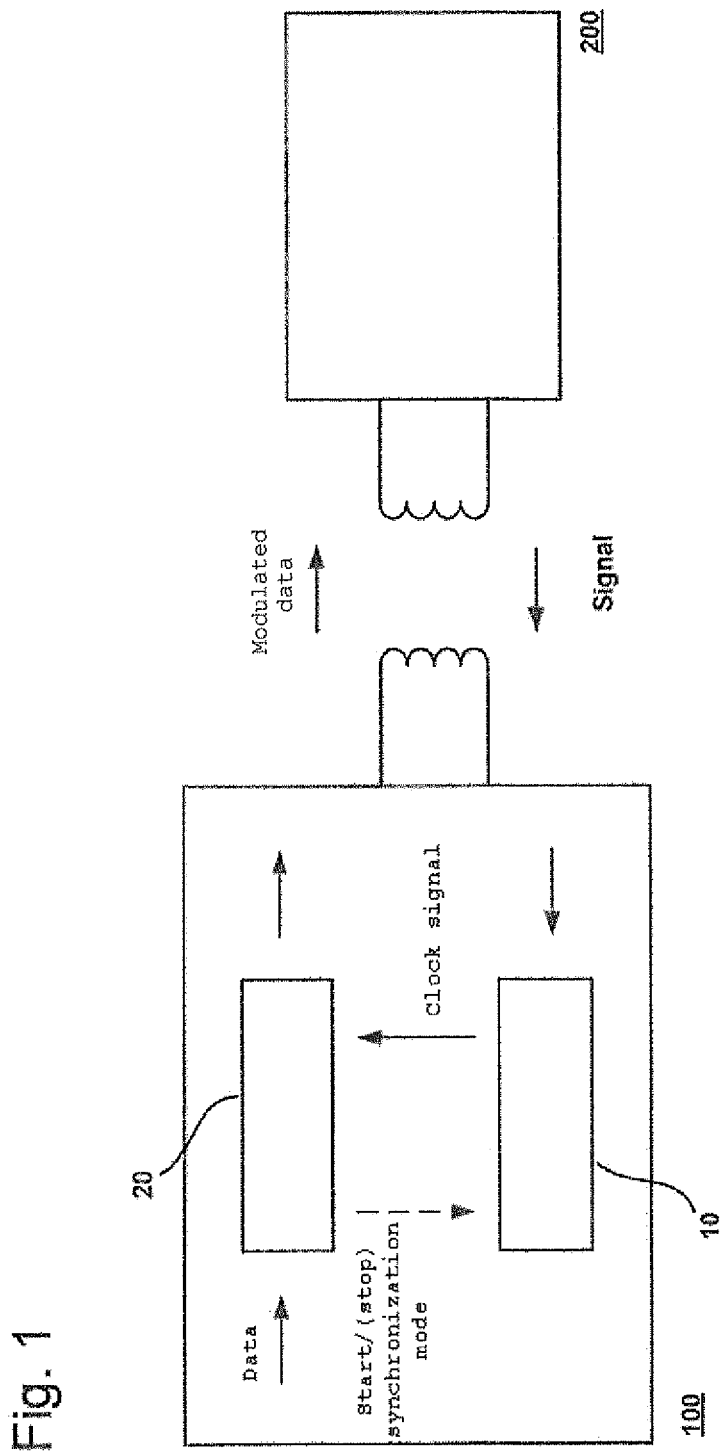
FIG. 1 shows an embodiment of a transponder unit for contactless data transmission with a reader.

The following detailed description refers to the accompanying drawings that show, by way of illustration, specific details and embodiments of the transponder unit and the system for contactless data transmission in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments provide a transponder unit, a system and a method for contactless data transmission which provides a stable and precise clock signal when the transponder unit is in transmission mode. In other words, this means that the clock frequency provided and used is essentially constant.

The transponder unit according to various embodiments for the contactless transmission of modulated data to a reader has a clock generator for generating a clock signal and for synchronizing the clock signal in a synchronization mode, on the basis of a signal received from the reader, a modulator, wherein the modulator is configured to take the clock signal from the clock generator as a basis for modulating data, wherein the modulator is configured to send a signal for starting the synchronization mode to the clock generator.

The signal emitted by the modulator for starting the synchronization mode allows the clock generator to be synchronized, on the basis of a signal received from the reader, even while the transponder unit is in transmission mode. This can be effected during a modulation pause, for example.

The synchronization of the frequency (clock) of the clock generator firstly aligns the frequency of the clock generator with that of the reader and at the same time prevents a phase shift during the modulation.

Furthermore, the modulator in one embodiment may be configured to send a signal for terminating the synchronization mode to the clock generator.

In a further embodiment, the clock generator is configured to send a signal to the modulator when the synchronization mode has terminated.

The modulator may be configured to send the signal for starting the synchronization mode to the clock generator during a modulation pause between a first and a second modulation pulse within a modulation block.

In a further embodiment, the modulator is configured to send the signal for starting the synchronization mode to the clock generator during a modulation pause between a first and a second modulation block within a data stream.

In a further embodiment, the modulator is configured to generate a modulation pause within a data block by masking out at least one modulation pulse, wherein the signal for starting the synchronization mode is sent to the clock generator during this modulation pause. In this case, the last modulation pulse or the last modulation pulses of the data block can be masked out, for example.

The transponder unit may also have a circuit arrangement, wherein the circuit arrangement is configured to apply an auxiliary carrier signal to the modulator, wherein the clock frequency of the auxiliary carrier is based on the clock signal from the clock generator. Usually, the frequency of the auxiliary carrier is produced by dividing the frequency of the clock generator. In RFID (Radio Frequency Identification) systems, modulation methods with auxiliary carriers are used particularly in inductively coupled systems in the frequency ranges 6.78 MHz, 13.56 MHz or 27.12 MHz. For 13.56 MHz systems, an auxiliary carrier frequency of 847 kHz (13.56 MHz/16) or 424 kHz (13.56 MHz/32) is used most of the time, but other divisions are also possible. The use of an auxiliary carrier ensures better data transmission overall.

In this case, the modulator may also have a combinational logic element, wherein the combinational logic element logically combines the data, the auxiliary carrier signal and the carrier signal to form a modulated data signal, and the modulator is configured to detect a modulation pause in the modulated data signal and to send the signal for starting the synchronization mode to the clock generator during this modulation pause.

In this case, the combinational logic element may be an AND and/or an XOR gate, wherein the AND gate does not bring about a phase change in the modulated carrier, whereas the XOR gate brings about a phase change of 180° in the carrier during a modulation pulse. In one embodiment, the modulation pause may be situated between a first modulation pulse and a second modulation pulse or, in a further embodiment, between a first modulation block and a second modulation block.

The modulator may also have a combinational logic element, wherein the combinational logic element logically combines the data, the auxiliary carrier signal and the carrier signal to form a modulated data signal, and the modulator is configured to generate a modulation pause by masking out at least one modulation pulse and is also configured to send the signal for starting the synchronization mode to the clock generator during this modulation pause. In this case, the combinational logic element may be an XOR and/or an AND gate.

The clock generator may be a PLL with an integrated oscillator.

In one embodiment, the transponder unit is an active transponder unit having a dedicated power supply, for example by means of a dedicated battery. In this case, the power supply/battery may also be arranged outside the transponder unit. By way of example, the storage battery in a mobile telephone may be used for this purpose.

The transponder unit may be a portable data storage medium, wherein the portable data storage medium may be a chip card or a tag.

A system for contactless data transmission may have a reader, wherein the reader is configured to emit a signal, a transponder unit having a clock generator for generating a clock signal and for synchronizing the clock signal in a synchronization mode, on the basis of the signal emitted by the reader, and a modulator, wherein the modulator is configured to take the clock signal from the clock generator as a basis for modulating data and sending a signal for starting the synchronization mode to the clock generator.

A method for transmitting data from a transponder unit to reader, wherein the transponder unit has a clock generator, for generating a clock signal and synchronizing the clock signal, and a modulator, may include:
  a signal is sent from the reader to the clock generator,
  the clock signal from the clock generator is sent to the modulator,
  the data to be transmitted are modulated in the modulator on the basis of the clock signal,
  a signal for starting the synchronization of the clock signal is sent from the modulator to the clock generator, and
  the clock signal is synchronized on the basis of the signal received from the reader.

In one embodiment, the modulator sends a signal for terminating the synchronization to the clock generator.

In a further embodiment, the signal for starting the synchronization is sent to the clock generator during a modulation pause between a first modulation pulse and a second modulation pulse within a data/modulation block.

In addition, the signal for starting the synchronization may be sent to the clock generator during a modulation pause between a first modulation block and a second modulation block within a data stream.

In a further embodiment, the method may further include:
  at least one modulation pulse is masked out in order to generate a modulation pause within a data block, and the signal for starting the synchronization of the clock signal is sent from the modulator to the clock generator within the modulation pause.

In this case, the modulation pause can be generated within the data block by masking out at least the last modulation pulse of the data block.

Furthermore, the method may further include:

an auxiliary carrier signal is applied to the modulator, wherein the clock frequency of the auxiliary carrier is based on the clock signal from the clock generator, and the data to be transmitted are modulated in the modulator on the basis of the clock signal and/or the auxiliary carrier signal.

FIG. 1 shows a first embodiment of a transponder unit 100 for contactless data transmission with a reader 200. The transponder unit 100 and the reader 200 together form a system for contactless data transmission. In this case, the data transmission can be effected inductively or capacitively.

The reader 200 contactlessly sends a signal which contains a piece of clock information to the transponder unit 100. This signal may be a carrier signal, for example. A customary clock frequency for carrier signals in RFID systems is 13.56 MHz (as per ISO/IEC 14443). The signal is received by the transponder unit 100 and is forwarded to a clock generator 10. The signal is conditioned by the clock generator 10 if necessary and again forwarded as a clock signal to a modulator 20. The modulator 20 uses the clock signal to modulate data, for the purpose of contactless transmission to the reader 200.

In order to ensure a stable clock frequency and phase when the transponder unit 100 is in transmission mode, that is to say during the data transmission from the transponder unit 100 to the reader 200, the modulator 20 sends—for example during a modulation pause—a signal for starting a synchronization mode to the clock generator 10. In this case, the clock generator 10 synchronizes its clock signal to the signal from the reader 200, with the result that even when transmission times in the transponder unit 100 are relatively long a clock discrepancy and hence a disturbance in the data transmission are effectively prevented.

Figure 2:
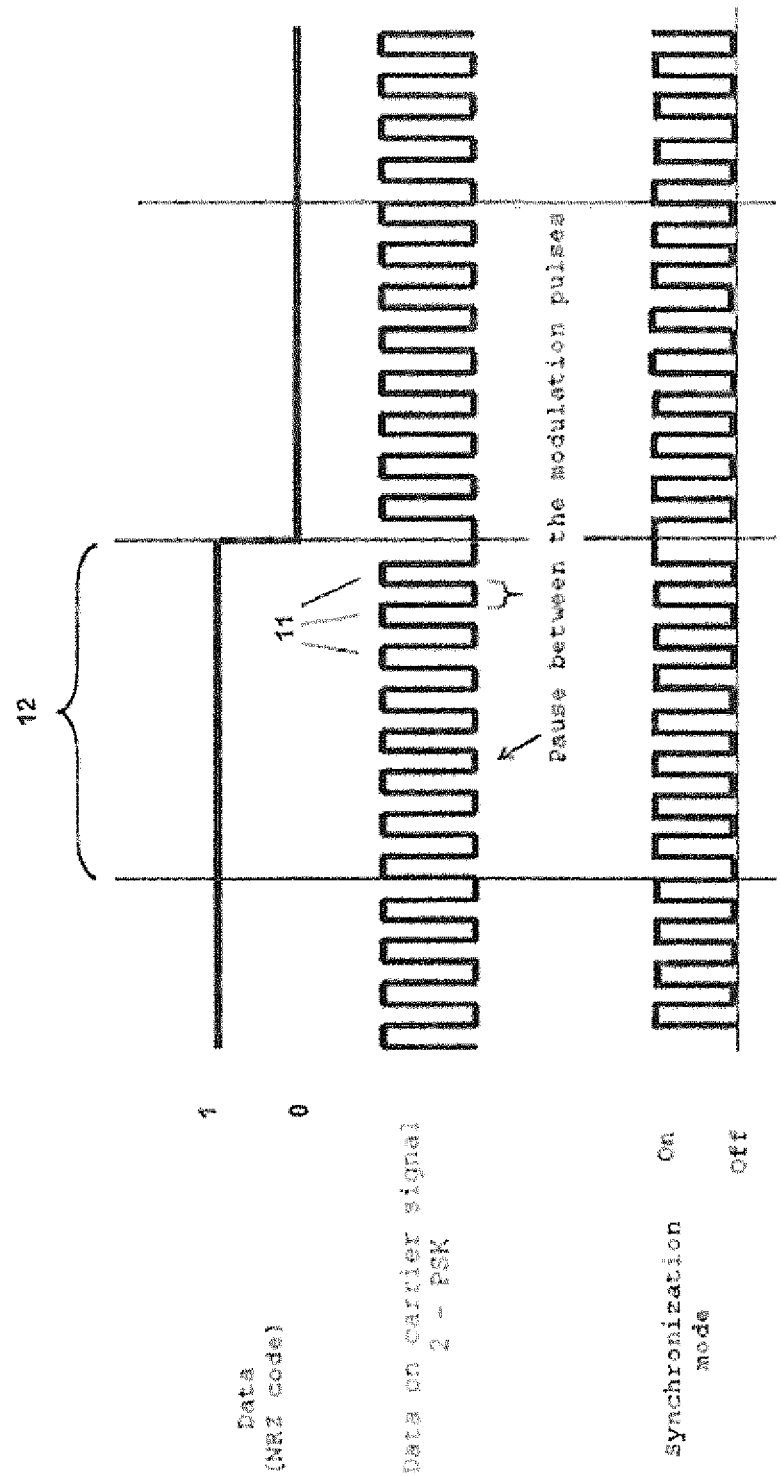
FIG. 2 shows an embodiment of a data carrier signal synchronization mode diagram with a pause between the modulation pulses for synchronization.

FIG. 2 shows an embodiment of a data carrier signal synchronization mode diagram with a pause between the modulation pulses 11 for synchronization. In this case, the data are coded using the NRZ code for example. The modulation method shown in this case is the 2-PSK (2-Phase Shift Keying) modulation method. The 2-PSK modulation method involves changeover between the phase states 0° and 180°. Other modulation methods, such as the Manchester code, would likewise be possible in another embodiment. The lower portion of the diagram shows the state—"on" or "off" of the synchronization mode.

In the embodiment in FIG. 2, the synchronization takes place during one or more pauses between the modulation pulses 11. In this case, a plurality of modulation pulses 11 are combined to form a data block 12. The starting signal for the synchronization/the synchronization mode is provided for the clock generator 10 by the modulator 20 at the end of at least one modulation pulse 11. The synchronization then takes place in the (transmission/modulation) pause between this modulation pulse and the next modulation pulse 11. It is possible to have some or all of this synchronization take place in all or some of the modulation pauses. Since the pause between the modulation pulses is relatively short, a fast clock generator 10 with, by way of example, a fast PLL circuit is required.

Figure 3:
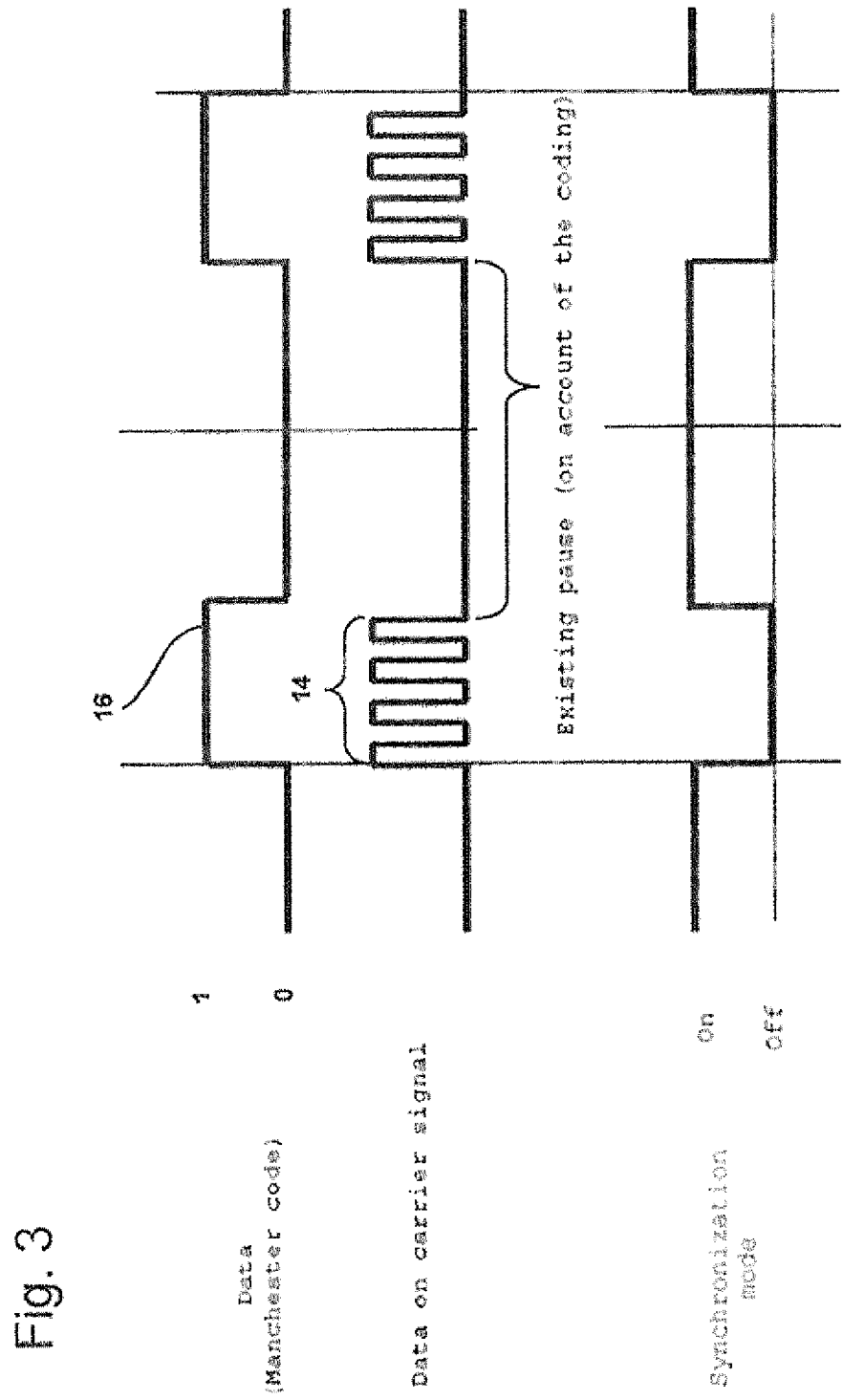
FIG. 3 shows an embodiment of a data carrier signal synchronization mode diagram with a pause on account of the coding for synchronization.

In the embodiment of a data carrier signal synchronization mode diagram in FIG. 3, the pause resulting from the coding is used for synchronization. In this case, the data are encoded using the Manchester code, for example. In the Manchester code, each binary "1" is represented by a negative edge in the half bit period and each binary "0" is represented by a positive edge in the half bit period. The pause, for example between two modulation blocks 14 within a data stream 16, that exists on account of the coding is then used for synchronization.

Figure 4:
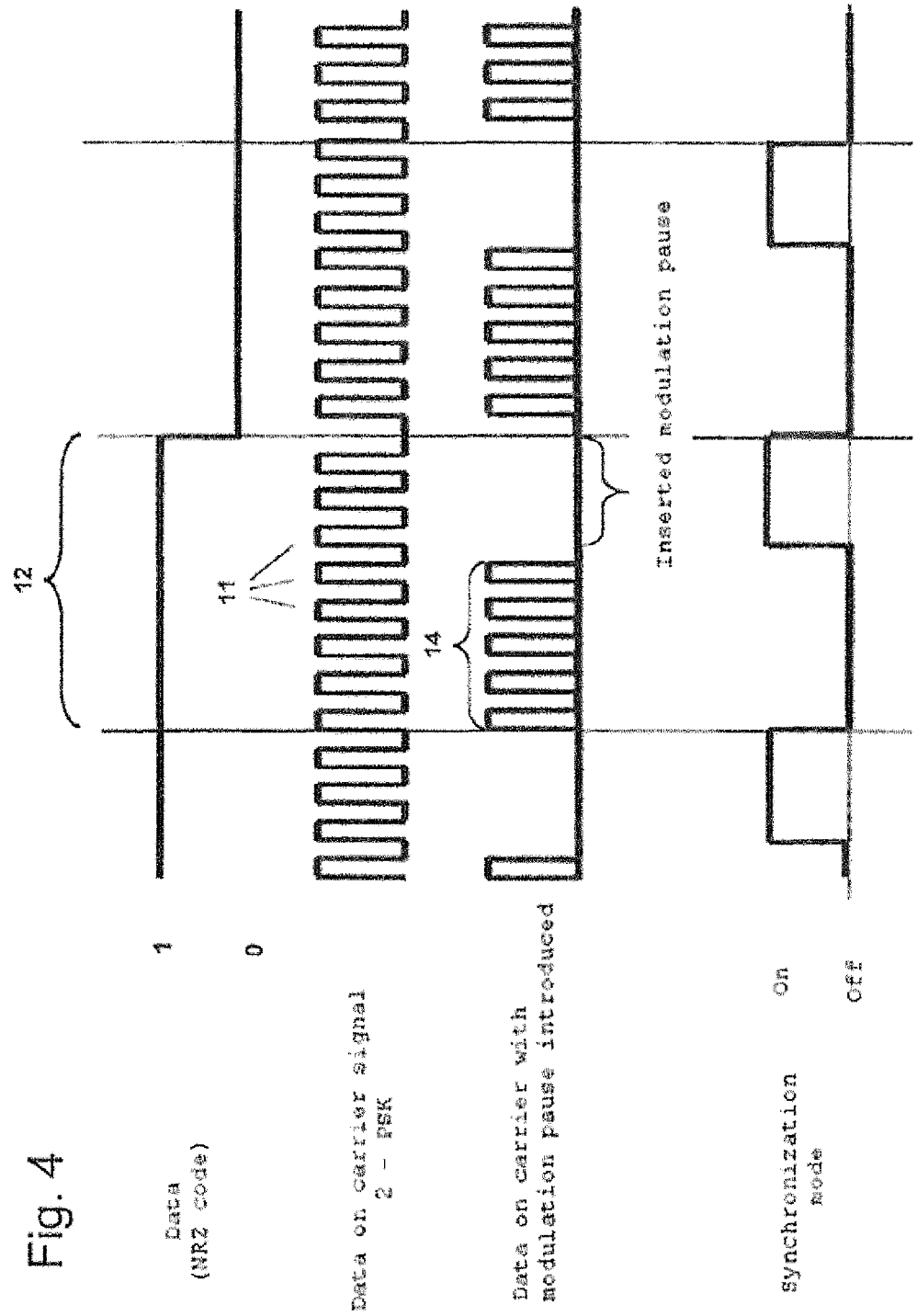
FIG. 4 shows an embodiment of a data carrier signal synchronization mode diagram with an inserted pause for synchronization.

FIG. 4 shows an embodiment of a data carrier signal synchronization mode diagram with an inserted pause for synchronization. In this case, the modulator 20 is configured to generate a modulation pause within a data block 12 by masking out at least one modulation pulse 11, wherein the signal for starting the synchronization mode is sent to the clock generator 10 during this modulation pause. By way of example, the last modulation pulse or the last modulation pulses of the data block 12 can be masked out in this case. The remaining modulation pulses form a modulation block 14.

Figure 5:
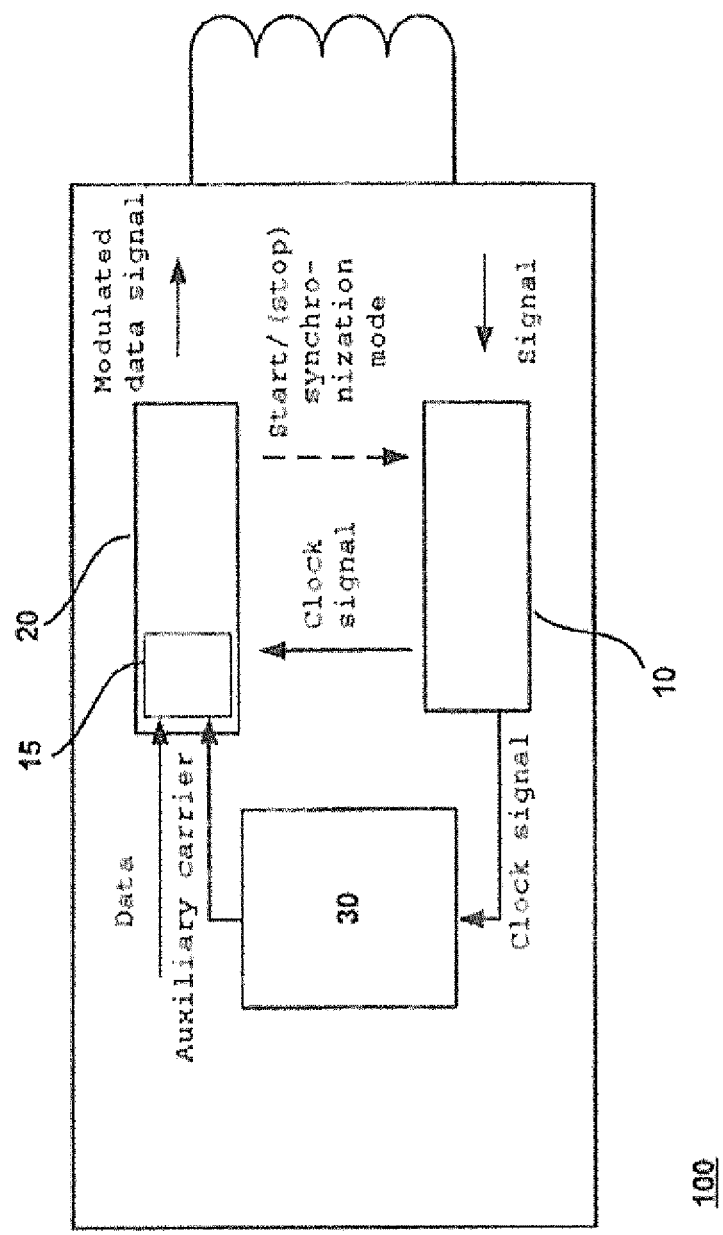
FIG. 5 shows a further embodiment of a transponder unit for contactless data transmission.

FIG. 5 shows a further embodiment of a transponder unit 100 for contactless data transmission. In this embodiment, the transponder unit 100 also has a circuit arrangement 30. The circuit arrangement 30 is configured to apply an auxiliary carrier signal to the modulator 20, wherein the clock frequency of the auxiliary carrier is based on the clock signal from the clock generator. Usually, the frequency of the auxiliary carrier is produced by dividing the frequency of the clock generator. In RFID systems, modulation methods with auxiliary carriers are used particularly in inductively coupled systems in the frequency ranges 6.78 MHz, 13.56 MHz or 27.12 MHz.

For 13.56 MHz systems, an auxiliary carrier frequency of 847 kHz (13.56 MHz/16) or 424 kHz (13.56 MHz/32) is used most of the time, but other divisions are also possible. The auxiliary carrier ensures better data transmission overall.

In the embodiment shown in FIG. 5, the modulator 20 also has a combinational logic element 15, wherein the combinational logic element 15 logically combines the data, the auxiliary carrier signal and the carrier signal to form a modulated data signal, and the modulator is configured to detect and to generate a modulation pause in the modulated data signal and to send the signal for starting the synchronization mode to the clock generator during this modulation pause.

Figure 6:
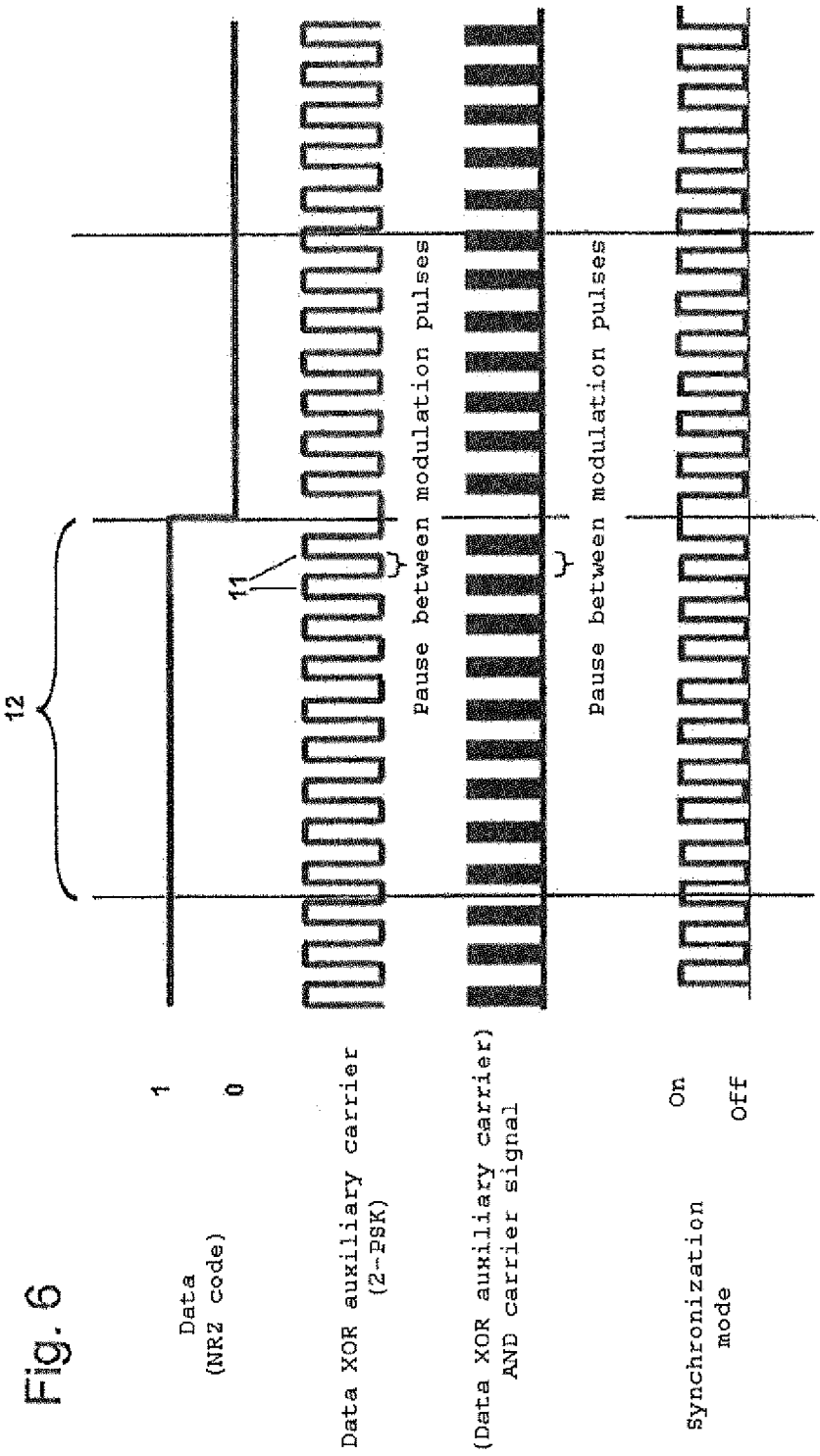
FIG. 6 shows an embodiment of a data (auxiliary) carrier signal synchronization mode diagram with a pause between the modulation pulses for synchronization.

FIG. 6 shows an embodiment of a data (auxiliary) carrier signal synchronization mode diagram, as possible in ISO/IEC 14443-type B, for example, with a pause between the modulation pulses 11 for synchronization. In this case, the modulator 20 combines data and auxiliary carrier using an XOR function. An AND function is then used to combine this logic combination in turn with the carrier signal, with the result that the following logic combination is produced:

(Data XOR Auxiliary Carrier) AND Carrier Signal

In this case, the data are encoded using the NRZ code, for example. The modulation method shown in this case was the 2-PSK modulation method. Other modulation methods, such as the Manchester code, could likewise be used in other embodiments.

In the embodiment in FIG. 6, the synchronization takes place in the pause between two modulation pulses 11. In this case, a plurality of modulation pulses 11 are combined to form a data block 12. The starting signal for the synchronization/synchronization mode is provided for the clock generator 10 by the modulator 20 at the end of at least one modulation pulse 11. The synchronization then takes place in the (transmission/modulation) pause between this modulation pulse and the next modulation pulse 11. It is possible to have some or all of this synchronization take place in all or some of the modulation pauses. Since the pause between the modulation pulses 11 is relatively short, a fast clock generator 10 having, by way of example, a fast PLL circuit is required.

Figure 7:
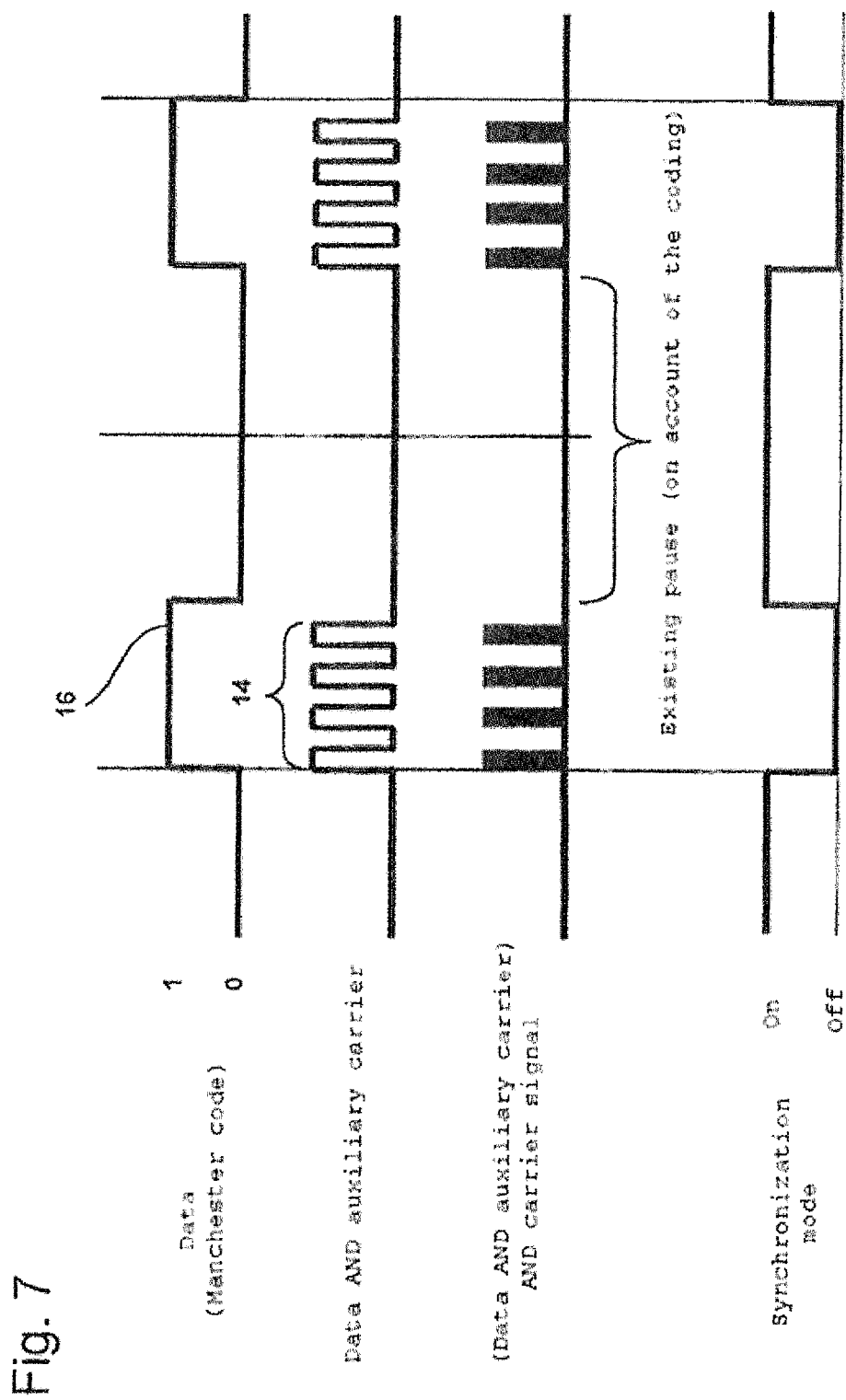
FIG. 7 shows an embodiment of a data (auxiliary) carrier signal synchronization mode diagram with a pause on account of the coding for synchronization.

FIG. 7 shows an embodiment of a data (auxiliary) carrier signal synchronization mode diagram, as possible in ISO/IEC 14443-type A, for example, with a pause on account of the coding. In this case, the modulator 20 combines data and auxiliary carrier using an AND function. A further AND function is then used to combine this logic combination in turn with the carrier signal, with the result that the following logic combination is produced:

(Data AND Auxiliary Carrier) AND Carrier Signal

In the embodiment in FIG. 7, the data are encoded using the Manchester code. The pause, for example between two modulation blocks 14 within a data stream 16, that exists on account of the coding is then used for synchronization.

Figure 8:
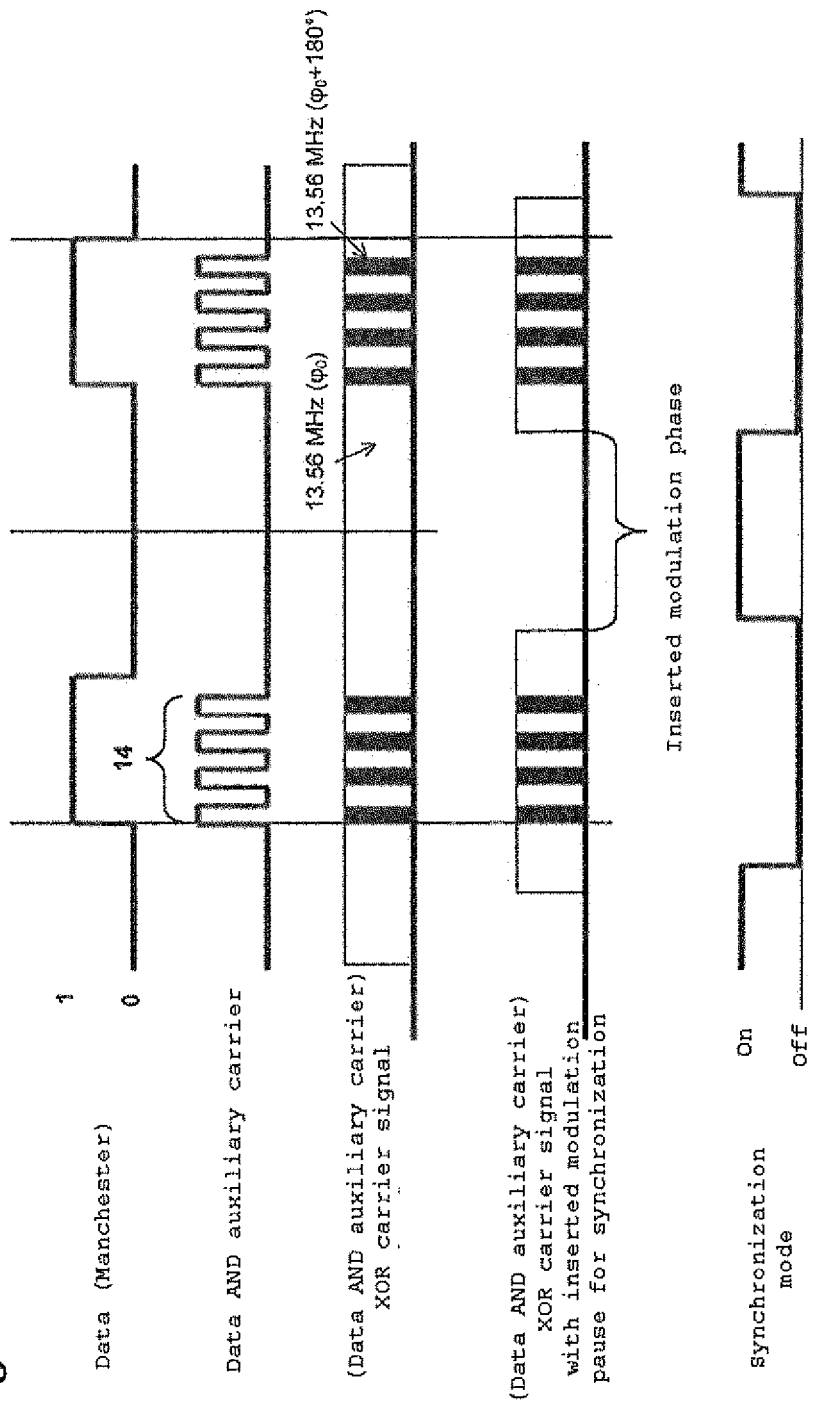
FIG. 8 shows an embodiment of a data (auxiliary) carrier signal synchronization mode diagram with an inserted pause for synchronization.

FIG. 8 shows an embodiment of a data (auxiliary) carrier signal synchronization mode diagram, as possible in ISO/IEC 14443-type A, for example, with an inserted pause for synchronization. In this case, the modulator 20 combines data and auxiliary carrier using an AND function. A XOR function is then used to combine this logic combination in turn with the carrier signal, with the result that the following logic combination is produced.

(Data AND Auxiliary Carrier) XOR Carrier Signal

Since no modulation pause is evident in the aforementioned logic combination, the modulator 20 is configured to automatically set a modulation pause, for example between two modulation blocks 14, wherein the signal for starting the synchronization mode is sent to the clock generator 10 during this modulation pause. The period/time of the modulation pause can be chosen freely in this case.

Figure 9:
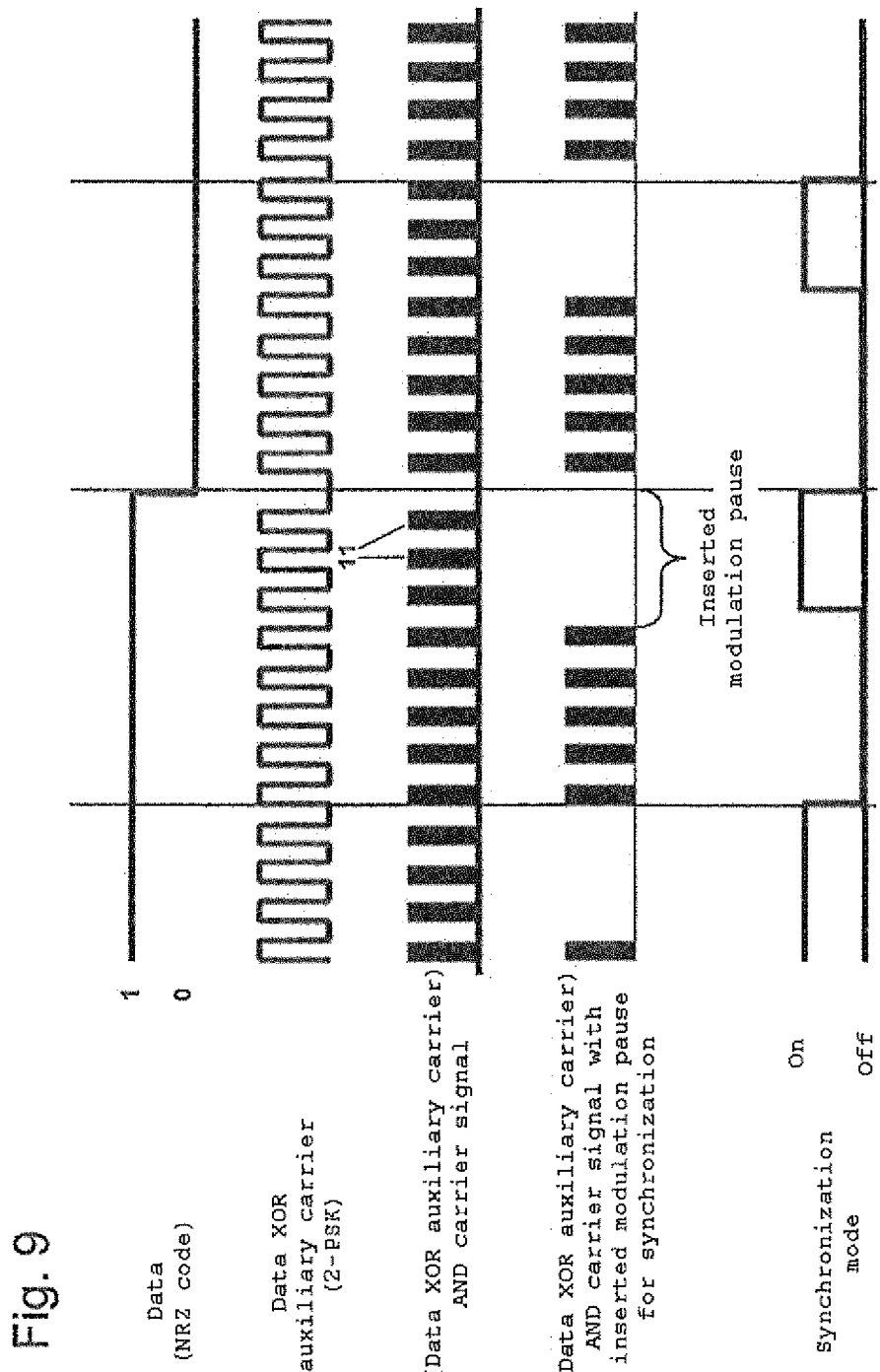
FIG. 9 shows a further embodiment of a data (auxiliary) carrier signal synchronization mode diagram with an inserted pause for synchronization.

FIG. 9 shows a further embodiment of a data (auxiliary) carrier signal synchronization mode diagram, as possible in ISO/IEC 14443-type B, for example, with an inserted pause for synchronization. In this case, the modulator 20 combines data and auxiliary carrier using an XOR function. An AND function is then used to combine this logic combination in turn with the carrier signal, with the result that the following logic combination is produced:

(Data XOR Auxiliary Carrier) AND Carrier Signal

In this case, the data are encoded using the NRZ code for example. The modulation method shown in this case was the 2-PSK modulation method.

Since no modulation pause is evident in the aforementioned logic combination in this embodiment either, the modulator 20 is configured to generate a modulation pause, by masking out at least one modulation pulse 11, wherein the signal for starting the synchronization mode is sent to the clock generator 10 during this modulation pause.

Figure 10:
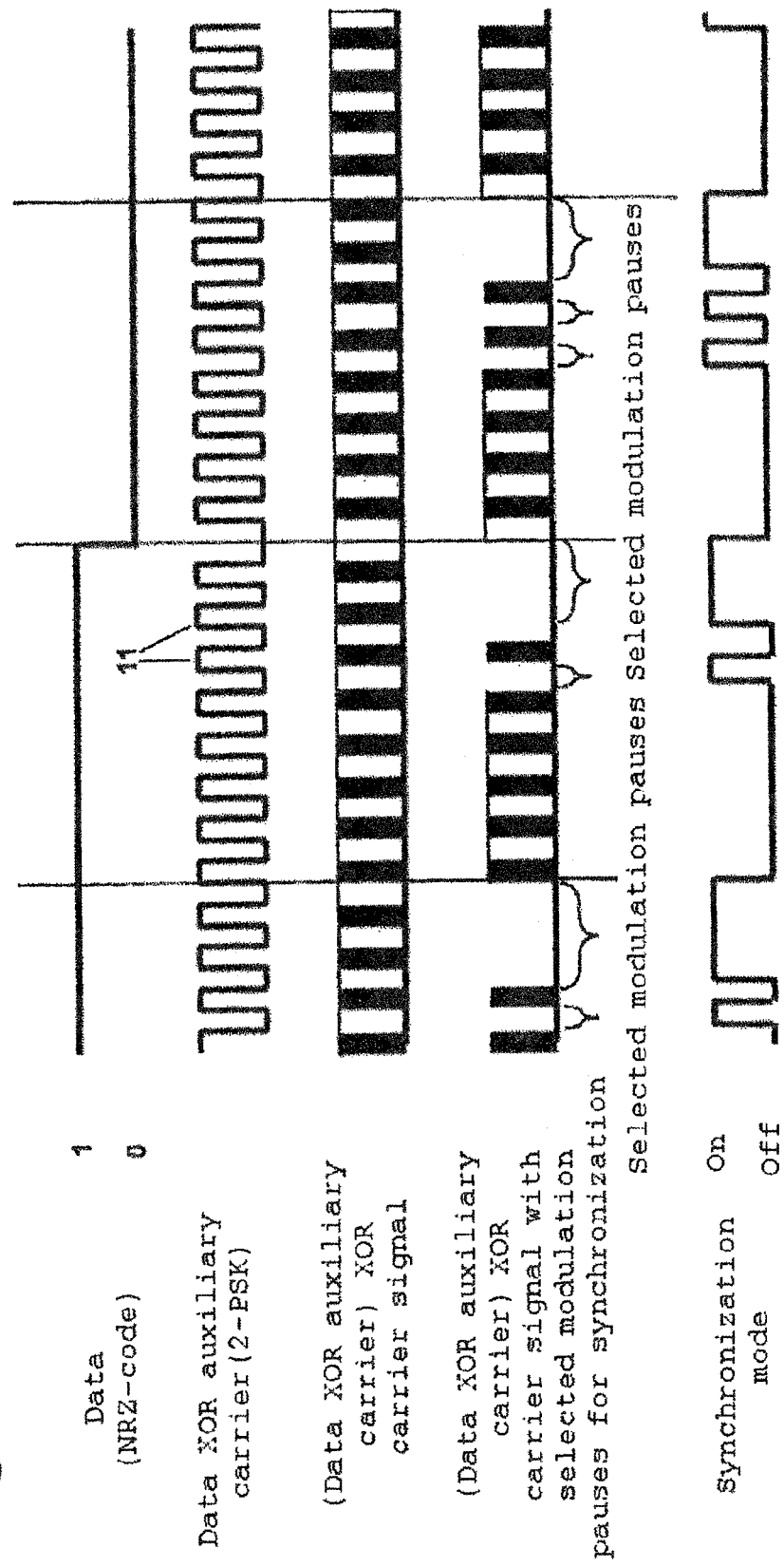
FIG. 10 shows an embodiment of a data (auxiliary) carrier signal synchronization mode diagram with a plurality of inserted pauses for synchronization.

FIG. 10 shows an embodiment of a data (auxiliary) carrier signal synchronization mode diagram with a plurality of pauses for synchronization. In this case, either suitable modulation pauses are detected, for example between two modulation pulses 11, or modulation pauses are purposely generated, for example by masking out individual modulation pulses 11. Hence, any combinations of the embodiments explained above are conceivable. By way of example, it is possible to insert modulation pauses according to requirements, for example in terms of the period and the number of modulation modes.

Figure 11:
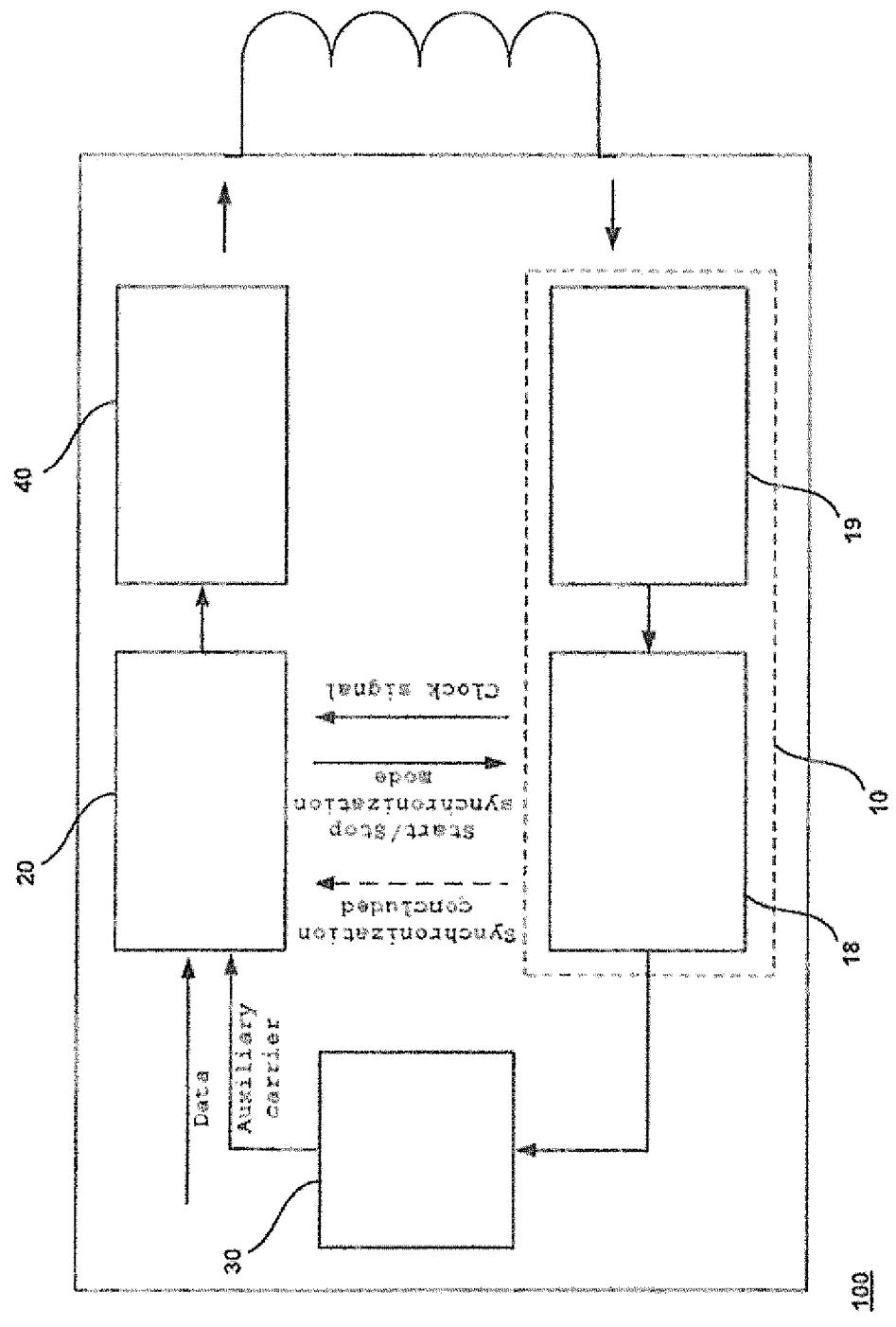
FIG. 11 shows a further embodiment of a transponder unit for contactless data transmission.

FIG. 11 shows a further embodiment of a transponder unit 100 for contactless data transmission. A (clock) signal, for example from a reader 200, is in this case extracted by a clock conditioning circuit 19 and forwarded to a PLL with an integrated oscillator 18. The PLL then sends a clock signal, which is based on the received signal, firstly to a logic circuit 30 and secondly to the modulator 20. The logic circuit generates an auxiliary carrier, which is likewise forwarded to the modulator 20. The modulator 20 is configured to start and, if necessary, to stop the synchronization mode by sending an appropriate signal to the PLL 18, if this is necessary, for example on account of an excessive clock discrepancy. In return, the PLL 18 can send a signal to the modulator 20 when it is ready for synchronization or when the synchronization has been successfully terminated. The modulated signal from the modulator 20 is then amplified by means of an amplifier 40 and output.

The synchronization intervals and also the period of the synchronization mode are freely selectable in this case.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A transponder unit for the contactless transmission of modulated data to a reader, the transponder unit comprising:
    a clock generator configured to generate a clock signal and to synchronize the clock signal in a synchronization mode, on the basis of a signal received from the reader; and
    a modulator configured to take the clock signal from the clock generator as a basis for modulating data;
    wherein the modulator is configured to send a signal for starting the synchronization mode to the clock generator during a modulation pause between a first modulation pulse and a second modulation pulse within a modulation block or within a data block; wherein the modulator is configured to generate the modulation pause within the data block by masking out at least one modulation pulse.

2. The transponder unit as claimed in claim 1, wherein the modulator is configured to send a signal for terminating the synchronization mode to the clock generator.

3. The transponder unit as claimed in claim 1, wherein the clock generator is configured to send a signal to the modulator when the synchronization mode has concluded.

4. The transponder unit as claimed in claim 1, wherein the transponder unit also has a circuit arrangement, wherein the circuit arrangement is configured to apply an auxiliary carrier signal to the modulator, wherein the clock frequency of the auxiliary carrier is based on the clock signal from the clock generator.

5. The transponder unit as claimed in claim 4, wherein the modulator further has a combinational logic element, wherein the combinational logic element logically combines the data, the auxiliary carrier signal and the carrier signal to form a modulated data signal.

6. The transponder unit as claimed in claim 5, wherein the combinational logic element is an XOR and/or an AND gate.

7. The transponder unit as claimed in claim 4, wherein the modulator further has a combinational logic element, wherein the combinational logic element logically combines the data, the auxiliary carrier signal and the carrier signal to form a modulated data signal.

8. The transponder unit as claimed in claim 1, wherein the clock generator is a PLL with an integrated oscillator.

9. The transponder unit as claimed in claim 1, wherein the transponder unit is an active transponder unit with a dedicated power supply.

10. A portable data storage medium, comprising:
a transponder unit, comprising:
  a clock generator configured to generate a clock signal and to synchronize the clock signal in a synchronization mode, on the basis of a signal received from the reader;
  a modulator configured to take the clock signal from the clock generator as a basis for modulating data;
  wherein the modulator is configured to send a signal for starting the synchronization mode to the clock generator during a modulation pause between a first modulation pulse and a second modulation pulse within a modulation block or within a data block;
  wherein the modulator is configured to generate a modulation pause within a data block by masking out at least one modulation pulse.

11. The portable data storage medium as claimed in claim 10, wherein the portable storage medium is a chip card or a tag.

12. A system for contactless data transmission, the system comprising:
  a reader configured to emit a signal;
  a transponder unit comprising a clock generator configured to generate a clock signal and to synchronize the clock signal in a synchronization mode, on the basis of the signal emitted by the reader, and a modulator, wherein the modulator is configured to take the clock signal from the clock generator as a basis for modulating data and sending a signal for starting the synchronization mode to the clock generator during a modulation pause between a first modulation pulse and a second modulation pulse within a modulation block or within a data block; wherein the modulator is configured to generate a modulation pause within the data block by masking out at least one modulation pulse.

13. A method for transmitting data from a transponder unit to a reader, wherein the transponder unit has a clock generator configured to generate a clock signal and to synchronize the clock signal, and a modulator, the method comprising:
  sending a signal from the reader to the clock generator;
  sending the clock signal from the clock generator to the modulator;
  modulating the data to be transmitted in the modulator on the basis of the clock signal;
  generating a modulation pause within a data block by masking out at least one modulation pulse;
  sending a signal for starting the synchronization of the clock signal from the modulator to the clock generator during the modulation pause between a first modulation pulse and a second modulation pulse within the modulation block or within the data stream; and
  synchronizing the clock signal on the basis of the signal received from the reader.

14. The method as claimed in claim 13, wherein the modulator sends a signal for terminating the synchronization to the clock generator.

15. The method as claimed in claim 13, further comprising:
  applying an auxiliary carrier signal to the modulator, wherein the clock frequency of the auxiliary carrier is based on the clock signal from the clock generator;
  modulating the data to be transmitted in the modulator on the basis of at least one of the clock signal and the auxiliary carrier signal.

\* \* \* \* \*